(12) United States Patent
Sakai

(10) Patent No.: US 11,675,567 B2
(45) Date of Patent: Jun. 13, 2023

(54) QUANTIZATION DEVICE, QUANTIZATION METHOD, AND RECORDING MEDIUM

(71) Applicant: FUJITSU LIMITED, Kawasaki (JP)

(72) Inventor: Yasufumi Sakai, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 436 days.

(21) Appl. No.: 16/840,601

(22) Filed: Apr. 6, 2020

(65) Prior Publication Data
US 2020/0334521 A1  Oct. 22, 2020

(30) Foreign Application Priority Data

Apr. 19, 2019 (JP) .............................. JP2019-080454

(51) Int. Cl.
| | | |
|---|---|---|
| G06F 7/499 | (2006.01) | |
| G06F 18/231 | (2023.01) | |
| G06F 18/21 | (2023.01) | |
| G06N 3/047 | (2023.01) | |
| G06N 3/084 | (2023.01) | |
| G06N 3/044 | (2023.01) | |

(52) U.S. Cl.
CPC ...... *G06F 7/49947* (2013.01); *G06F 18/2185* (2023.01); *G06F 18/231* (2023.01); *G06N 3/044* (2023.01); *G06N 3/047* (2023.01); *G06N 3/084* (2013.01)

(58) Field of Classification Search
None
See application file for complete search history.

(56) References Cited

U.S. PATENT DOCUMENTS

| | | | |
|---|---|---|---|
| 5,432,883 A | 7/1995 | Yoshihara | |
| 6,718,299 B1 | 4/2004 | Kondo et al. | |
| 8,553,764 B2* | 10/2013 | Yamori | H04N 19/513 |
| | | | 375/240.03 |
| 2012/0259905 A1* | 10/2012 | Kan | G06F 7/49942 |
| | | | 708/505 |
| 2018/0107925 A1 | 4/2018 | Choi et al. | |
| 2019/0385050 A1* | 12/2019 | Wang | G06N 3/04 |

FOREIGN PATENT DOCUMENTS

| | | |
|---|---|---|
| JP | H05-303398 A | 11/1993 |
| JP | 2000-200098 A | 7/2000 |
| JP | 2019-046072 A | 3/2019 |

OTHER PUBLICATIONS

Extended European Search Report dated Sep. 14, 2020 for corresponding European Patent Application No. 20166174.1, 7 pages.

(Continued)

*Primary Examiner* — Tahmina N Ansari
(74) *Attorney, Agent, or Firm* — Fujitsu Patent Center

(57) ABSTRACT

An information processing device that executes calculation of a neural network, includes a memory; and a processor coupled to the memory and the processor configured to: set a division position for quantization of a variable to be used for the calculation so that a quantization error based on a difference between the variable before the quantization and the variable after the quantization is reduced; and quantize the variable based on the division position set.

12 Claims, 15 Drawing Sheets

(56) References Cited

OTHER PUBLICATIONS

Gray, Robert et al., "Quantization", IEEE Transactions on Information Theory, XP055726536, DOI: 10.1109/18.720541, vol. 44, No. 6, Retrieved from the Internet: URL:https://www.ic.tu-berlin.de/fileadmin/fg121/Source-Coding_WS12/selected-readings/Gray_and_Neuhoff_1998.pdf, pp. 2325-2383, Oct. 1, 1998.

Japanese Office Action dated Nov. 22, 2022 for corresponding Japanese Patent Application No. 2019-080454, with English Translation, 13 pages.

Li, Fengfu et al., "Ternary weight networks", arXiv.org [online], arXiv:1605.04711 v2, United States, Cornell University, Nov. 2016, pp. 1-7, [Searched on Nov. 15, 2022], Internet:<URL:https://arxiv.org/abs/1605.04711v2>.

* cited by examiner

QUANTIZATION DEVICE, QUANTIZATION METHOD, AND RECORDING MEDIUM

CROSS-REFERENCE TO RELATED APPLICATION

This application is based upon and claims the benefit of priority of the prior Japanese Patent Application No. 2019-80454, filed on Apr. 19, 2019, the entire contents of which are incorporated herein by reference.

FIELD

The embodiments discussed herein are related to an information processing device, an information processing method, and a recording medium storing an information processing program.

BACKGROUND

A method of executing a product-sum operation for a process of a neural network using neuromorphic elements in which conductance changes in an analog manner has been proposed (refer to, for example, Japanese Patent No. 6293963). A method of using a learning function of a neural network to inhibit the accuracy of a linear prediction coefficient from decreasing due to a canceled digit in numerical calculation in an audio encoding device has been proposed (refer to, for example, Japanese Laid-open Patent Publication No. 05-303398). A method of optimally integrating a characteristic parameter for audio with a characteristic parameter for an image to improve recognition performance of a recognizing device in order to recognize the audio using the audio and the image has been proposed (refer to, for example, Japanese Laid-open Patent Publication No. 2000-200098).

SUMMARY

According to an aspect of the embodiments, an information processing device that executes calculation of a neural network, includes a memory; and a processor coupled to the memory and the processor configured to: set a division position for quantization of a variable to be used for the calculation so that a quantization error based on a difference between the variable before the quantization and the variable after the quantization is reduced; and quantize the variable based on the division position set.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, when data to be used for calculation of a neural network and various variables that are weights or the like and to be used for the calculation of the neural network are expressed using floating-point numbers, the accuracy of the calculation of the neural network may be improved, but the size of a computing unit to be used is large and a time period for the calculation is long. On the other hand, when the data and the various variables such as the weights are quantized and expressed using fixed-point numbers, the size of the computing unit may be reduced and the time period for the calculation may be short, but the accuracy of the calculation of the neural network may decrease. When the accuracy of the calculation decreases, the accuracy of learning of the neural network decreases and the accuracy of an inference process using a neural network built by learning or the like decreases.

According to an aspect, an object of the present disclosure is to suppress a decrease in the accuracy of calculation of a neural network when the calculation of the neural network is executed using a quantized variable.

Hereinafter, embodiments are described with reference to the drawings.

Figure 1:
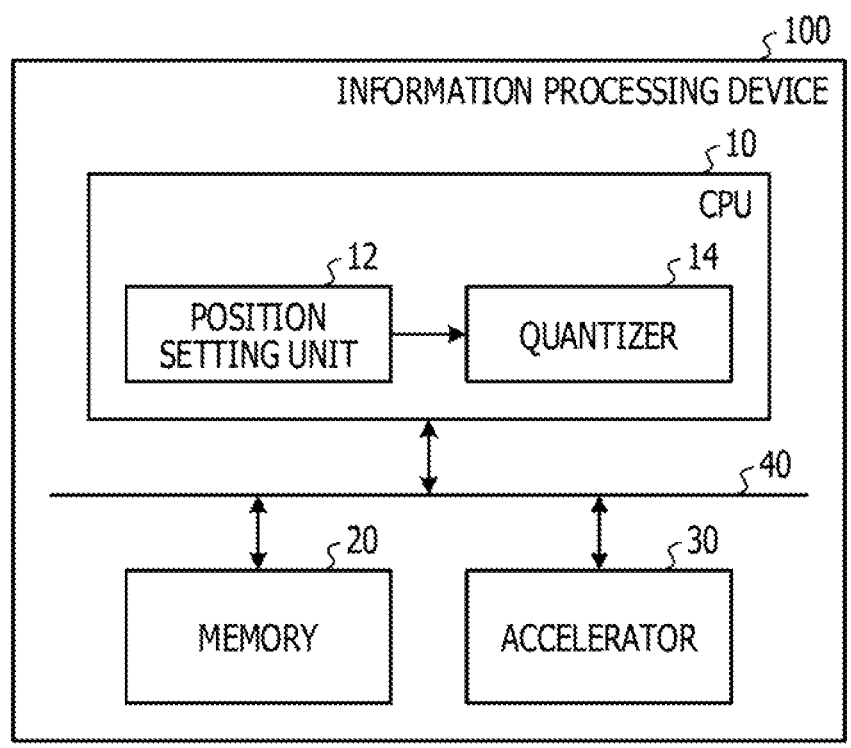
FIG. 1 is a block diagram illustrating an example of an information processing device according to an embodiment.

FIG. 1 illustrates an example of an information processing device according to an embodiment. An information processing device 100 illustrated in FIG. 1 is used for learning or inference in image processing using a neural network or the like, for example. The information processing device 100 includes a central processing unit (CPU) 10, a memory 20, and an accelerator 30 that are coupled to each other via a communication bus 40. The information processing device 100 may include another processor, instead of the CPU 10. The information processing device 100 may include a component other than the components illustrated in FIG. 1 and may not include the accelerator 30.

The CPU 10 includes a computing unit (not illustrated), a position setting unit 12, and a quantizer 14. The position setting unit 12 and the quantizer 14 may be realized by hardware or by causing the CPU 10 to execute an information processing program held in the memory 20. Functions of the position setting unit 12 and the quantizer 14 are described later.

The memory 20 stores various programs including an operating system (OS) and an application program, and data and variables to be used for processes of the neural network. The memory 20 may store intermediate data generated in the middle of calculation of the neural network and the like. The accelerator 30 is, for example, a graphics processing unit (GPU), a digital signal processor (DSP), or the like and may execute a product-sum operation, a matrix operation, and the like of the neural network, instead of the CPU.

In the embodiment, for example, since the calculation of the neural network is executed using fixed-point number data, each of the CPU 10 and the accelerator 30 includes a fixed-point number computing unit that is not illustrated. To inhibit a decrease in the accuracy of the calculation when the calculation of the neural network is executed using the fixed-point number data, the CPU 10 executes a process of optimizing division positions (thresholds) for quantization in order to quantize floating-point number data and convert the floating-point number data into the fixed-point number data. The optimization of the division positions for the quantization is described with reference to FIG. 2.

The position setting unit 12 sets the division positions so that quantization errors calculated based on differences between the variables before the quantization and the variables after the quantization are reduced. The division positions are the thresholds for the quantization of the variables such as weights to be used for the calculation of the neural network.

For example, the quantizer 14 reads the floating-point number data (input data and the weights) stored in the memory 20 and quantizes the floating-point number data based on the division positions set by the position setting unit 12 to convert the floating-point number data into the fixed-point number data. Alternatively, the quantizer 14 changes the division positions of the fixed-point number data such as intermediate data obtained in the calculation of the neural network, based on the division positions set by the position setting unit 12. Then, the information processing device 100 uses the fixed-point number data with the optimized division positions to execute a deep neural network process including forward propagation, back-propagation, and optimization for updating the weights.

Figure 2:
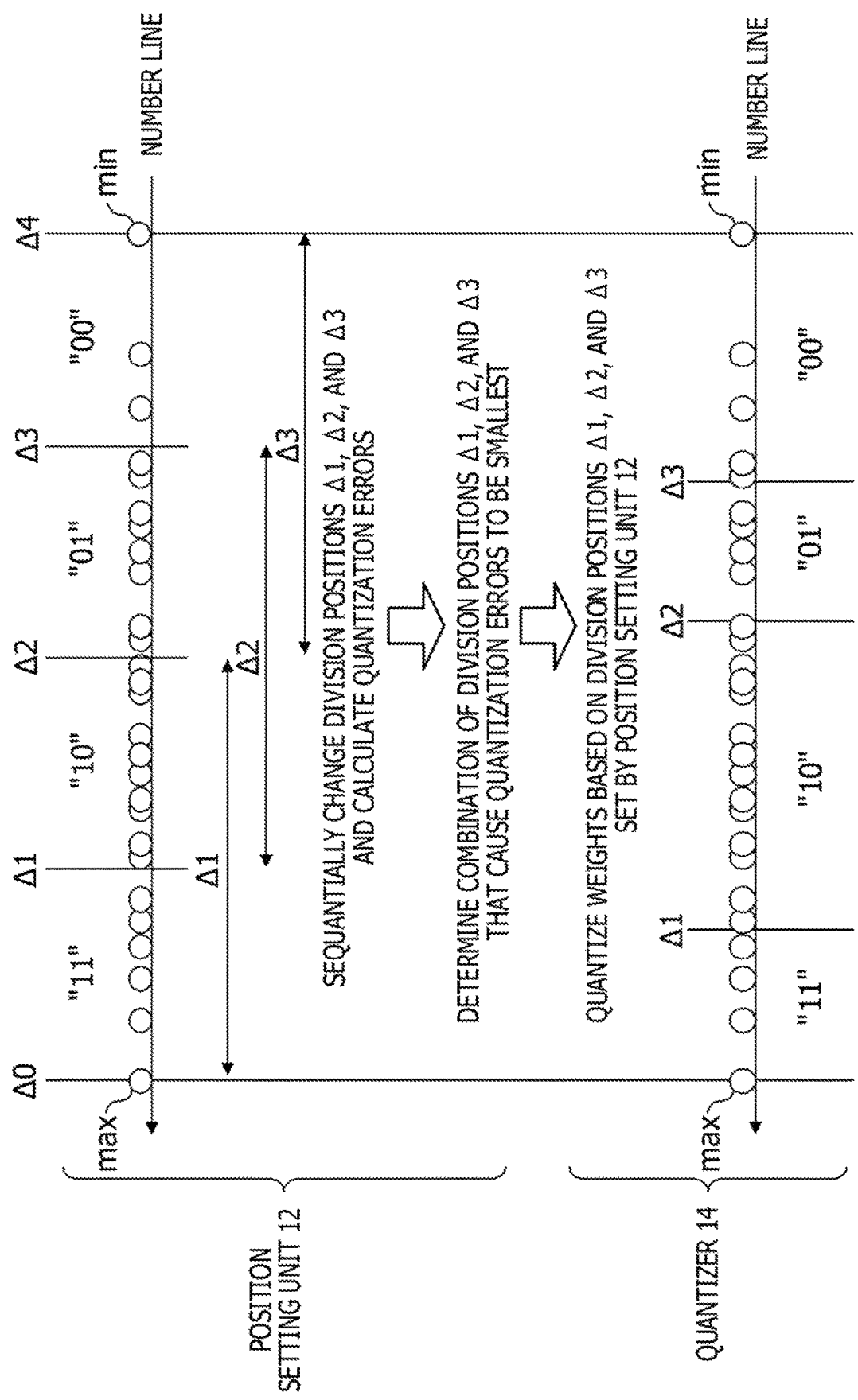
FIG. 2 is an explanatory diagram illustrating an example of operations of the information processing device illustrated in FIG. 1.

FIG. 2 illustrates an example of operations of the information processing device 100 illustrated in FIG. 1. For example, operations illustrated in FIG. 2 are realized by the information processing program executed by the CPU 10. For example, FIG. 2 illustrates an example of an information processing method by the information processing device 100 and an example of the operations by the information processing program executed by the information processing device 100.

Although the example illustrated in FIG. 2 describes an operation of quantizing the weights that are of one type of the variables used for the calculation of the neural network, the following applies to the quantization of input data and the quantization of intermediate data between layers. For example, in FIG. 2, weights (indicated by circles) to be used for any of layers included in the neural network are arranged on each of number lines. On each of the number lines illustrated in FIG. 2, a value is larger toward the left side of FIG. 2 and smaller toward the right side of FIG. 2. Values of the weights are indicated at the centers of regions in which the circles are illustrated.

In the example illustrated in FIG. 2, each of the weights is quantized to any of 4 values (that are "11", "10", "01", and "00" in binary). A quantization number (or the number of values quantized) that is the number of values after quantization is $2^2$. Since the quantization number is set to $2^m$ (m is a natural number of 1 or greater), the variables after the quantization may be expressed using all binary values of m bits and treated as the fixed-point number data, and the calculation of the neural network may be executed using a normal computing unit. In this example, each of the weights after the quantization is expressed using a fixed-point number of 2 bits.

Since the floating-point number data is quantized to the fixed-point number data, the configurations of the computing units such as multipliers may be simplified, compared to the case where computation is executed using the floating-point number data. The number of computing units installed in the CPU 10 or installed in the accelerator 30 may be increased. Therefore, processing performance of the computation of the neural network may be improved, compared to the case where the computation of the floating-point number data is executed.

When the quantization number is "4", the position setting unit 12 sets division positions Δ1, Δ2, and Δ3 between an upper limit Δ0 for the quantization and a lower limit, Δ4 for the quantization. The division positions Δ1, Δ2, and Δ3 are thresholds for the quantization. Hereinafter, the upper limit 40 and the lower limit Δ4 are referred to as division positions in some cases. The quantization number that is the number of values after the quantization may not be 4 as long as the quantization number is 2 or greater. As described above, however, it is preferable that the quantization number be $2^m$.

For example, the position setting unit 12 starts executing a process of setting the division positions Δ1, Δ2, and Δ3 from an initial state in which intervals between pairs of the division positions (Δ0 and Δ1, Δ1 and Δ2, Δ2 and Δ3, and Δ3 and Δ4) adjacent to each other are equal to each other. In the initial state before the division positions Δ1, Δ2, and Δ3 are set, the amount of calculation for the optimization of the division positions Δ1, Δ2, and Δ3 may be reduced by setting the intervals between the pairs of division positions to be equal to each other.

For example, the position setting unit 12 sets the maximum value max of the weights to the upper limit Δ0 for the quantization and sets the minimum value min of the weights to the lower limit Δ4 for the quantization. An upper limit on the weights to be quantized may be determined to be the upper limit Δ0 in advance. In this case, the value of a weight that is larger than the upper limit Δ0 is changed to the value of the upper limit Δ0. Similarly, a lower limit on the weights to be quantized may be determined to be the lower limit Δ4 in advance. In this case, the value of a weight that is smaller than the lower limit Δ4 is changed to the value of the lower limit Δ4.

For example, the position setting unit 12 sequentially changes the division positions Δ1, Δ2, and Δ3. Every time the position setting unit 12 changes the division positions Δ1, Δ2, and Δ3, the position setting unit 12 calculates quantization errors based on differences between the values of the weights before the quantization and the values of the weights after the quantization. For example, the position setting unit 12 sequentially changes the division position Δ1 between the division positions Δ0 and Δ2, calculates a quantization error, and sets, as a new division position Δ1, the division position Δ1 that causes the quantization error to be smallest.

Then, the position setting unit 12 sequentially changes the division position Δ2 between the new division position Δ1 and the division position Δ3, calculates a quantization error, and sets, as a new division position Δ2, the division position Δ2 that causes the quantization error to be smallest. Then, the position setting unit 12 sequentially changes the division position Δ3 between the new division position Δ2 and the division position Δ4, calculates a quantization error, and sets, as a new division position Δ3, the division position Δ3 that causes the quantization error to be smallest.

After that, the position setting unit 12 sequentially changes the newly set division positions Δ1, Δ2, and Δ3. Every time the position setting unit 12 changes the division positions, Δ1, Δ2, and Δ3, the position setting unit 12 calculates the quantization errors based on the differences between the values of the weights before the quantization and the values of the weights after the quantization. Then, the process of calculating new division positions Δ1, Δ2, and Δ3 is repeatedly executed until the division positions Δ1, Δ2, and Δ3 are no longer changed, and a combination of the division positions Δ1, Δ2, and Δ3 that cause the quantization errors to be smallest is determined.

Since the position setting unit 12 sequentially changes the division positions Δ1, Δ2, and Δ3 and calculates the quantization errors, the optimal division positions Δ1, Δ2, and Δ3 are found. Thus, for example, the smallest value of the quantization errors may be detected by repeatedly executing the loop process by the simple information processing program. A method of calculating the optimal division positions Δ1, Δ2, and Δ3 is not limited to the foregoing. The optimal division positions Δ1, Δ2, and Δ3 may be calculated in a round-robin fashion, although the amount of calculation increases.

The position setting unit 12 may use Equation (1) to calculate a quantization error $L_{OSS}$.

$$\text{Loss} = -\sum_{i=1}^{n} \frac{\|W_{k_i}\|_{L1}^2}{k_i} \quad (1)$$

In Equation (1), n (n is a natural number of 2 or greater) is the quantization number, and $k_i$ is the number of non-zero elements of a variable $W_i$ to be quantized. $W_{ki}$ is a variable that has the same number of elements as the variable $W_i$ and of which the elements are a number k of elements extracted from the variable $W_i$ in descending order of absolute value and elements of 0 other than the extracted elements.

Equation (1) is obtained by expanding Equation (2) expressed using a square error that is the square of a quantization error between a set W of variables before the quantization and a set $W_Q$ of variables after the quantization. Equation (1) is a conditional equation for minimizing a quantization error for a quantized variable.

$$\text{Loss} = \|W - W_Q\|^2 \quad (2)$$
$$= \|W_1 + W_2 + \cdots + W_n - (W_{Q1} + W_{Q2} + \cdots + W_{Qn})\|^2$$

In Equation (2), W is a set of parameters before the quantization, and $W_Q$ is a set of parameters after the quantization.

After the position setting unit 12 sets the optimal division positions Δ1, Δ2, and Δ3, the quantizer 14 uses, as thresholds, the division positions Δ1, Δ2, and Δ3 set by the position setting unit 12 to quantize each of weights expressed using floating-point numbers to any of the 4 values. For example, the quantizer 14 uses Equation (3) to quantize each of the weights.

$$W_{Qi} = \frac{\|W_{k_i^*}\|_{L1}}{k_i^*} \text{sign}(W_{k_i^*}) \quad (3)$$

In Equation (3), $W_{Qi}$ is the value of a variable after the quantization. $k_{i*}$ indicates the number of non-zero elements of tensors of the weight to be quantized and is a value of k that minimizes the quantization error $L_{OSS}$. $W_{k1*}$ indicates a set obtained using each of the tensors of the weight divided by a set division position and to be quantized.

The information processing device 100 uses the optimally quantized variables and the like to execute the calculation of the neural network. For example, the information processing device 100 executes a forward propagation process of sequentially executing calculation from the input side of the neural network in inference using the neural network. The information processing device 100 executes a back-propagation process of sequentially executing calculation from the output side of the neural network in the learning using the neural network after the forward propagation process. The information processing device 100 executes an update process of updating the variables based on results of the back-propagation process.

The division positions for the quantization may be set for each of mini-batch processes or may be set for each of the forward propagation process, the back-propagation process, and the update process. By setting the division positions for the quantization so that the quantization errors $L_{OSS}$ are smallest, the accuracy of the calculation of the neural network may be improved, compared to the case where the division positions are not changed. For example, in the neural network that recognizes an object in an image, an image recognition rate may be improved, compared to the case where the division positions are not changed.

A recognition rate when the calculation of the neural network is executed using the fixed-point number data in which the number of bits is reduced by quantization may be equal to or higher than a recognition rate when the calculation of the neural network is executed using the floating-point number data. As a result, the computation efficiency of the CPU 10 may be improved and a power efficiency may be improved, compared to the case where the floating-point number data is used.

As described above, in the embodiment described with reference to FIGS. 1 and 2, since the division positions are set so that the quantization errors are smallest, the accuracy of the calculation of the neural network may be improved, compared to the case where the division positions are not changed. For example, when the calculation of the neural network is executed using the quantized variables, a decrease in the accuracy of recognition may be suppressed.

For example, since the computation of the neural network may be executed using the fixed-point number data, the configurations of the computing units such as multipliers may be simplified and the number of computing units installed in the CPU 10 may be increased, compared to the case where the computation is executed using the floating-point number data. As a result, the processing performance of the computation of the neural network may be improved, compared to the case where the computation is executed using the floating-point number data. The computation efficiency of the CPU 10 may be improved and the power efficiency may be improved.

Figure 3:
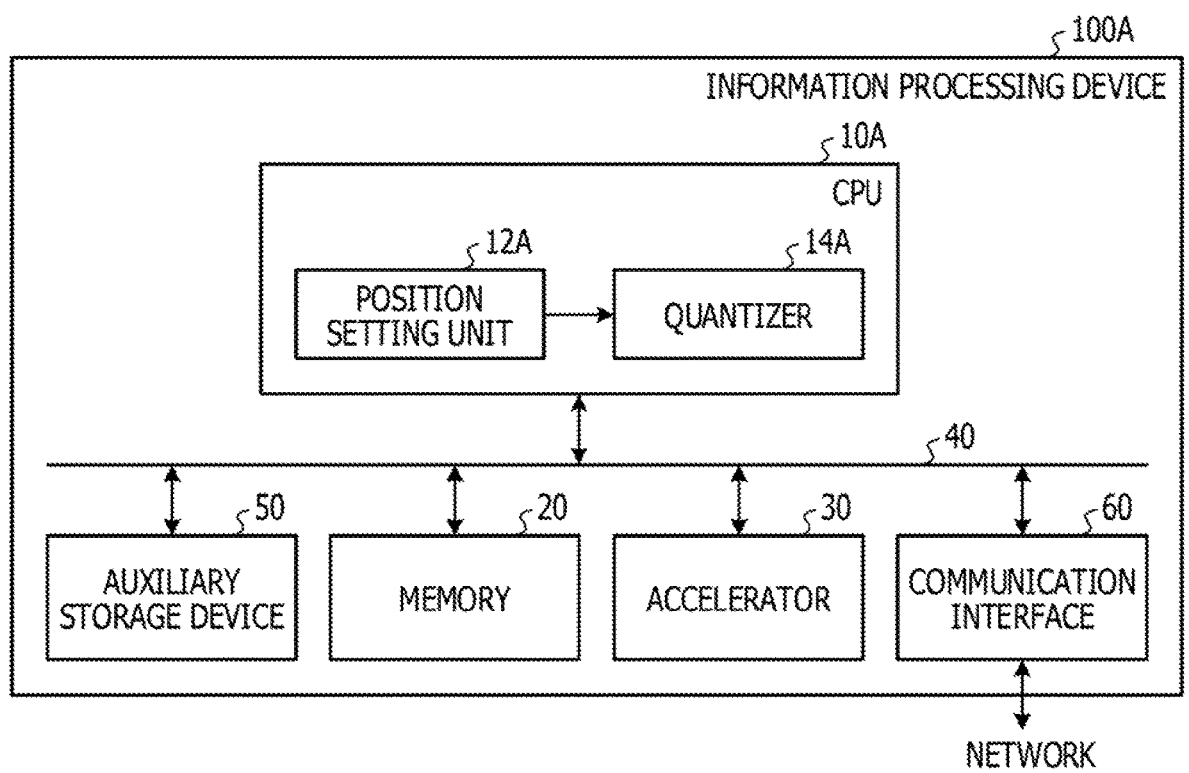
FIG. 3 is a block diagram illustrating an example of an information processing device according to another embodiment.

FIG. 3 illustrates an example of an information processing device according to another embodiment. Components that are illustrated in FIG. 3 and are the same as or similar to those illustrated in FIG. 1 are indicated by the same reference signs as those illustrated in FIG. 1 and will not be described in detail. An information processing device 100A illustrated in FIG. 3 is used for, for example, learning or inference in image processing using a neural network or the like, similarly to the information processing device 100 illustrated in FIG. 1. The information processing device 100A includes a CPU 10A, a memory 20, an accelerator 30, an auxiliary storage device 50, and a communication interface 60 that are coupled to each other via a communication bus 40. The information processing device 100A may include a component other than the components illustrated in FIG. 3.

The CPU 10A includes a computing unit (not illustrated), a position setting unit 12A, and a quantizer 14A. Each of the CPU 10A and the accelerator 30 includes a fixed-point number computing unit not illustrated, similarly to the foregoing embodiment. The position setting unit 12A and the quantizer 14A may be realized by hardware or by causing the CPU 10A to execute an information processing program held in the memory 20. The position setting unit 12A has the same functions as the position setting unit 12 illustrated in FIG. 1, except that the position setting unit 12A sets 7 division positions in order to quantize each of variables such as weights to any of 8 values, for example. The quantizer 14A has the same functions as the quantizer 14 illustrated in FIG. 1, except that the quantizer 14A quantizes the variables based on the 7 division positions set by the position setting unit 12A.

The auxiliary storage device 50 stores various programs such as an operating system (OS) to be executed by the CPU 10A and an application program to be executed by the CPU 10A, data to be used for the calculation of the neural network, various variables such as weights, and the like. The programs and the like stored in the auxiliary storage device 50 are transferred to the memory 20 and executed by the CPU 10A. The communication interface 60 has a function of communicating with another information processing device and the like via a network, for example. Therefore, a plurality of information processing devices may be used to execute the calculation of the neural network in parallel.

Figure 4:
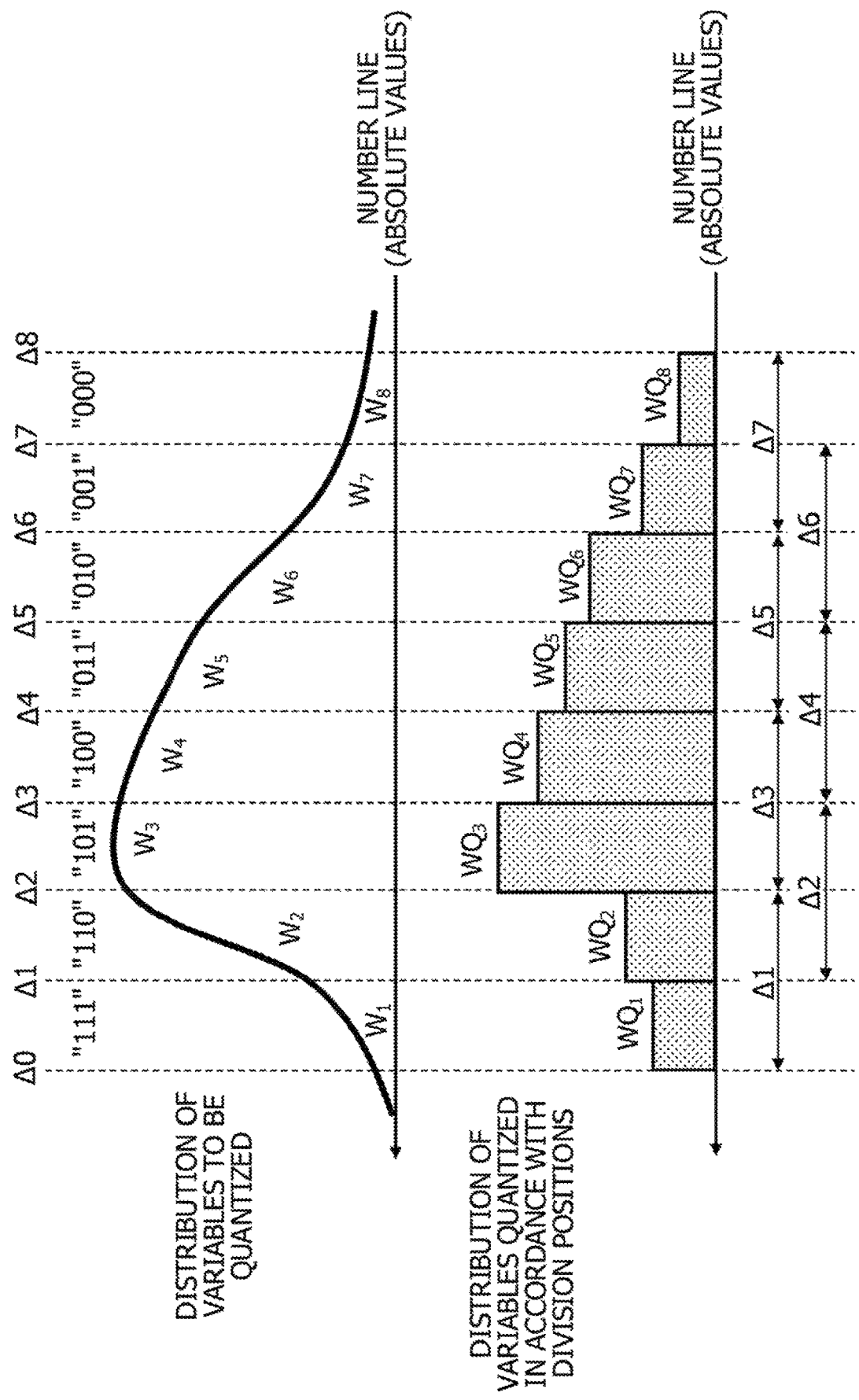
FIG. 4 is an explanatory diagram illustrating an example of operations of the information processing device illustrated in FIG. 3.
Figure 5:
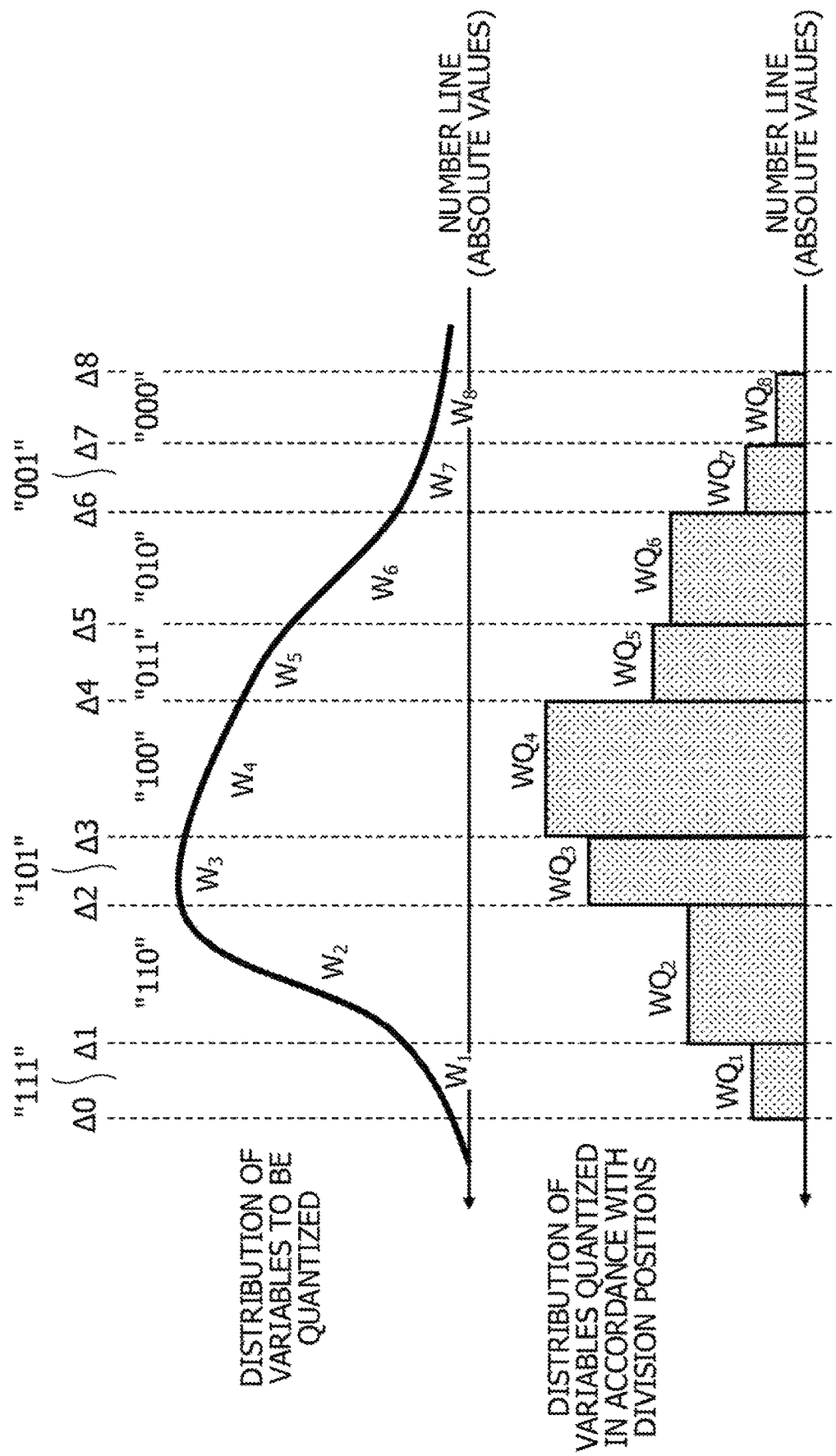
FIG. 5 is an explanatory diagram illustrating division positions optimized by an update process described with reference to FIG. 4 and variables quantized in accordance with the optimized division positions.

FIGS. 4 and 5 illustrate examples of operations of the information processing device 100A illustrated in FIG. 3. The same operations as those described with reference to FIG. 2 will not be described in detail. For example, operations that are described with reference to FIGS. 4 and 5 are realized by the information processing program executed by the CPU 10A. For example, FIGS. 4 and 5 describe an information processing method by the information processing device 100A and the operations by the information processing program executed by the information processing device 100A.

The example illustrated in FIG. 4 describes the case where the weights that are of one type of the variables to be used for the calculation of the neural network are quantized, similarly to FIG. 2. Input data, activation functions, intermediate data output from a layer included in the neural network, and the like may be quantized for use in the calculation of the neural network. Number lines illustrated in FIGS. 4 and 5 indicate absolute values, which are not distinguished between positive and negative values. On each of the number lines illustrated in FIGS. 4 and 5, an absolute value is larger toward the left side of FIGS. 4 and 5 and smaller toward the right side of FIGS. 4 and 5. Each of the variables (weights) before the quantization is expressed using a floating-point number (of 32 bits, 16 bits, or the like).

In the embodiment, each of absolute values of the weights is quantized to any of 8 values (that are "111", "110", "101", "100", "011", "010", "001", and "000" in binary). For example, a quantization number that is the number of values assigned by the quantization is 8 ($=2^3$). In this case, 7 division positions $\Delta 1$, $\Delta 2$, $\Delta 3$, $\Delta 4$, $\Delta 5$, $\Delta 6$, and $\Delta 7$ that are thresholds for the quantization are set between an upper limit $\Delta 0$ for the quantization and a lower limit $\Delta 8$ for the quantization. In this case, each of the weights after the quantization is expressed using a fixed-point number of 3 bits.

In FIG. 4, a weight that is larger than the upper limit $\Delta 0$ is changed to the upper limit $\Delta 0$, and a weight that is smaller than the lower limit $\Delta 8$ is changed to the lower limit $\Delta 8$. For example, the upper limit $\Delta 0$ and the lower limit $\Delta 8$ are determined in advance by a designer of the neural network or a user who uses the neural network.

A thick curved line illustrated on the upper side of FIG. 4 indicates a distribution of variables (weights in this example) expressed using floating-point number data and to be quantized. Reference signs $W_1$ to $W_8$ indicate groups of variables divided by the division positions $\Delta 1$ to $\Delta 7$ and to be quantized. Rectangles illustrated on the lower side of FIG. 4 indicate a distribution of the variables when the variables are quantized using the division positions $\Delta 1$ to $\Delta 7$ as the thresholds. Reference signs $W_{Q1}$ to $W_{Q8}$ indicate the quantized variables. The quantization number is specified to be a number n (n is a natural number of 2 or greater) in advance by the designer of the neural network or the user who uses the neural network.

For example, the position setting unit 12A arranges the division positions $\Delta 1$, $\Delta 2$, $\Delta 3$, $\Delta 4$, $\Delta 5$, $\Delta 6$, and $\Delta 7$ at equal intervals between the upper limit $\Delta 0$ and the lower limit $\Delta 8$ before starting executing a process of quantizing the weights. The position setting unit 12A sorts elements included in tensors of the weights to be quantized in descending order of absolute value. Therefore, each of the variable groups indicated by the reference signs $W_1$ to $W_8$ may include both positive and negative values. Then, the position setting unit 12A divides the sorted weights into 8 sets in accordance with the division positions.

After dividing the weights, the position setting unit 12A uses the foregoing Equation (1) to calculate a quantization error every time the position setting unit 12A sequentially changes the division position $\Delta 1$ among the division positions for the quantization of weights in a range from the division position $\Delta 0$ to the division position $\Delta 2$ in the same manner as the process described with reference to FIG. 2. The position setting unit 12A updates the division position $\Delta 1$ to a position that causes the value of the quantization error to be smallest and is included in the range in which the division position $\Delta 1$ is changed.

Then, the position setting unit 12A uses the foregoing Equation (1) to calculate a quantization error every time the position setting unit 12A sequentially changes the division position $\Delta 2$ in a range from the newly updated division position $\Delta 1$ to the division position $\Delta 3$. The position setting unit 12A updates the division position 62 to a position that causes the value of the quantization error to be smallest and is included in the range in which the division position Δ2 is changed.

The position setting unit 12A executes the process of sequentially updating each of the division positions Δ3, Δ4, Δ5, Δ6, and Δ7 in the same manner as the process of updating the foregoing division positions Δ1 and Δ2. The position setting unit 12A executes the process of sequentially updating each of the updated division positions Δ1 to Δ7 in the same manner as the process of updating the foregoing division positions Δ1 and Δ2. When one or more of the division positions Δ1 to Δ7 are updated, the position setting unit 12A uses the division positions Δ1 to Δ7 after the update to further execute the update process. For example, until all the division positions Δ1 to Δ7 are no longer updated, the position setting unit 12A repeatedly executes the update process.

When the process of calculating the optimal division positions Δ1 to Δ7 illustrated in FIG. 4 is executed using the absolute values that are not distinguished between positive and negative values, the amount of the calculation for the quantization may be smaller, compared to the case where the absolute values are distinguished between positive and negative values. On the other hand, a decrease (for example, the amounts of the quantization errors) in the recognition rate in the neural network is larger, compared to the case where the absolute values are distinguished between positive and negative values. Therefore, when the amount of the calculation for the quantization is to be suppressed, it is preferable to execute the process of calculating the optimal division positions using the absolute values that are not distinguished between positive and negative values.

FIG. 5 illustrates the division positions Δ1 to Δ7 optimized by the update process described with reference to FIG. 4 and the variables quantized using the optimized division positions Δ1 to Δ7. For example, FIG. 5 illustrates the division positions Δ1 to Δ7 when the division positions Δ1 to Δ7 are no longer updated.

When the position setting unit 12A completes the process of updating the division positions Δ1 to Δ7, the quantizer 14A uses the foregoing Equation (3) to quantize the weights. For example, the quantizer 14A quantizes the variables using sets ($W_{k_1*}$ to $W_{k_n*}$) obtained using the tensors of the weights divided in accordance with the set division positions and to be quantized and the numbers ($k_{1*}$ to $k_{n*}$) of non-zero elements of the tensors. Therefore, each of the weights to be quantized is assigned to any of the values $W_{Q1}$ to $W_{Q8}$ after the quantization. The values $W_{Q1}$ to $W_{Q8}$ are absolute values that are not distinguished between positive and negative values.

Therefore, even in the case where floating-point number data of 16 bits or 32 bits that has a large amount of information is quantized to fixed-point number data of 3 bits that has a small amount of information, a decrease in the accuracy of the calculation of the neural network may be suppressed. For example, in the neural network that recognizes an object in an image, the image recognition rate may be improved, compared to the case where the division positions are not changed.

Figure 6:
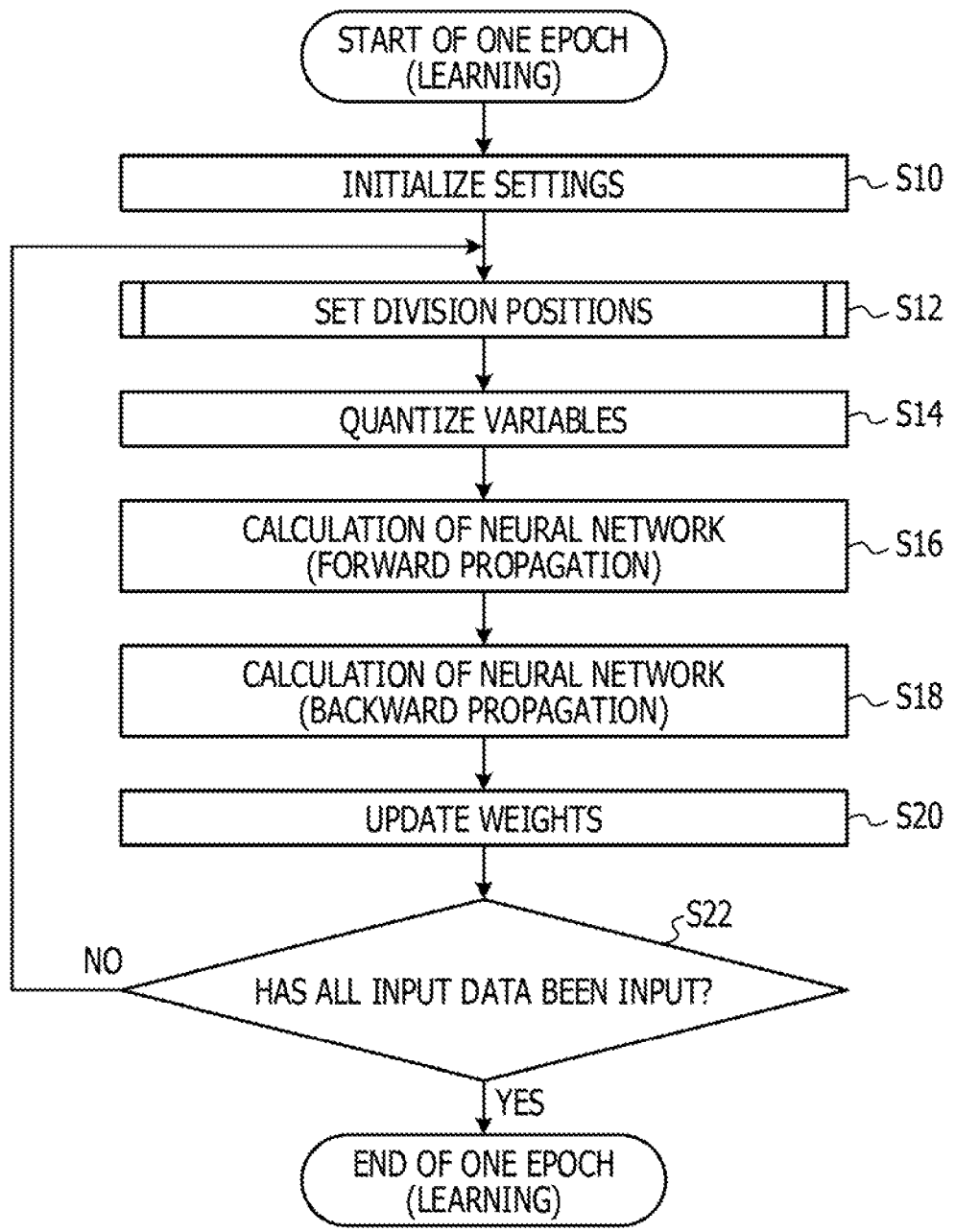
FIG. 6 is a flow diagram illustrating an example of learning of a neural network by the information processing device illustrated in FIG. 3.

FIG. 6 illustrates an example of the learning of the neural network by the information processing device 100A illustrated in FIG. 3. For example, a flow illustrated in FIG. 6 is realized by the information processing program executed by the CPU 10A. For example, the flow illustrated in FIG. 6 indicates an example of the information processing method by the information processing device 100A and an example of the operations by the information processing program executed by the information processing device 100A. For example, the flow illustrated in FIG. 6 is executed for each of epochs. One epoch is a unit of a process to be executed for a size corresponding to the size of data to be subjected to the learning of the neural network and includes a predetermined number of mini-batch processes.

First, in step S10, the CPU 10A initializes settings, such as settings of initial values of the various variables such as the weights and settings of mini-batch sizes, in order to execute the learning of the neural network.

Then, in step S12, the position setting unit 12A of the CPU 10A sets the division positions to be used for the quantization process to cause quantization errors to be smallest, as described with reference to FIGS. 4 and 5. An example of a process of setting the division positions is described later with reference to FIG. 7. Then, in step S14, the quantizer 14A of the CPU 10A uses the division positions set in step S12 as the thresholds to quantize the variables such as the weights, as described with reference to FIG. 5. For example, the position setting unit 12A uses the foregoing Equation (3) to quantize the variables. The variables to be quantized may include input data input to the neural network and intermediate data to be input and output between the layers of the neural network. In this case, the setting of the division positions may be executed for each of the variables.

Then, in step S16, the CPU 10A executes calculation for propagation from an input layer of the neural network to an output layer of the neural network based on the input data input to the neural network and the variables such as the weights set in the neural network or, for example, executes the calculation for the forward propagation. As a result of the calculation for the forward propagation, values of loss functions that are functions of output of the output layer of the neural network are calculated.

The purpose for the learning of the neural network is to update the values of the weights set in the neural network. Therefore, in step S18 after step S16, the CPU 10A executes calculation for propagation from the output layer of the neural network to the input layer of the neural network or, for example, executes the calculation for the back-propagation to determine values by which the weights are to be updated. For example, as an algorithm for determining the values by which the weights are to be used and that are used for the calculation for the back-propagation, gradient descent is used.

After the calculation for the back-propagation, in step S20, the CPU 10A updates the values of the weights using the calculated values by which the weights are to be updated. Then, when all input data corresponding to learning for one epoch is input in step S22, the CPU 10A terminates the process. When input data that is not yet input exists, the CPU 10A causes the process to return to step S12.

Until all the input data corresponding to learning for one epoch is input, the CPU 10A repeatedly executes the calculation for the forward propagation, the calculation for the back-propagation, and the operation of updating the weights. For example, the processes of steps S12, S14, S16, S18, and S20 are executed for each of the mini-batch sizes. For example, until a process of one epoch is completed, the mini-batch processes are repeatedly executed. In the embodiment, the division positions are updated in step S12 every time the learning that is repeatedly executed for each of the mini-batch processes is executed, and the variables are quantized in accordance with positions that cause the quantization errors to be smallest in step S14. This may reduce a decrease in the recognition rate of the neural network using the variables such as the quantized weights.

In the process illustrated in FIG. 6, for each of the mini-batch processes, before the calculation of the neural network, the division positions are set and the weights or the like are quantized in accordance with the set division positions. Then, the calculation of the neural network is executed using the weights quantized using the division positions set in the mini-batch processes or the like. The calculation of the neural network is executed by the CPU 10A that has set the division positions and quantized the weights or the like, which is efficient in that data is not transferred to another information processing device.

Figure 7:
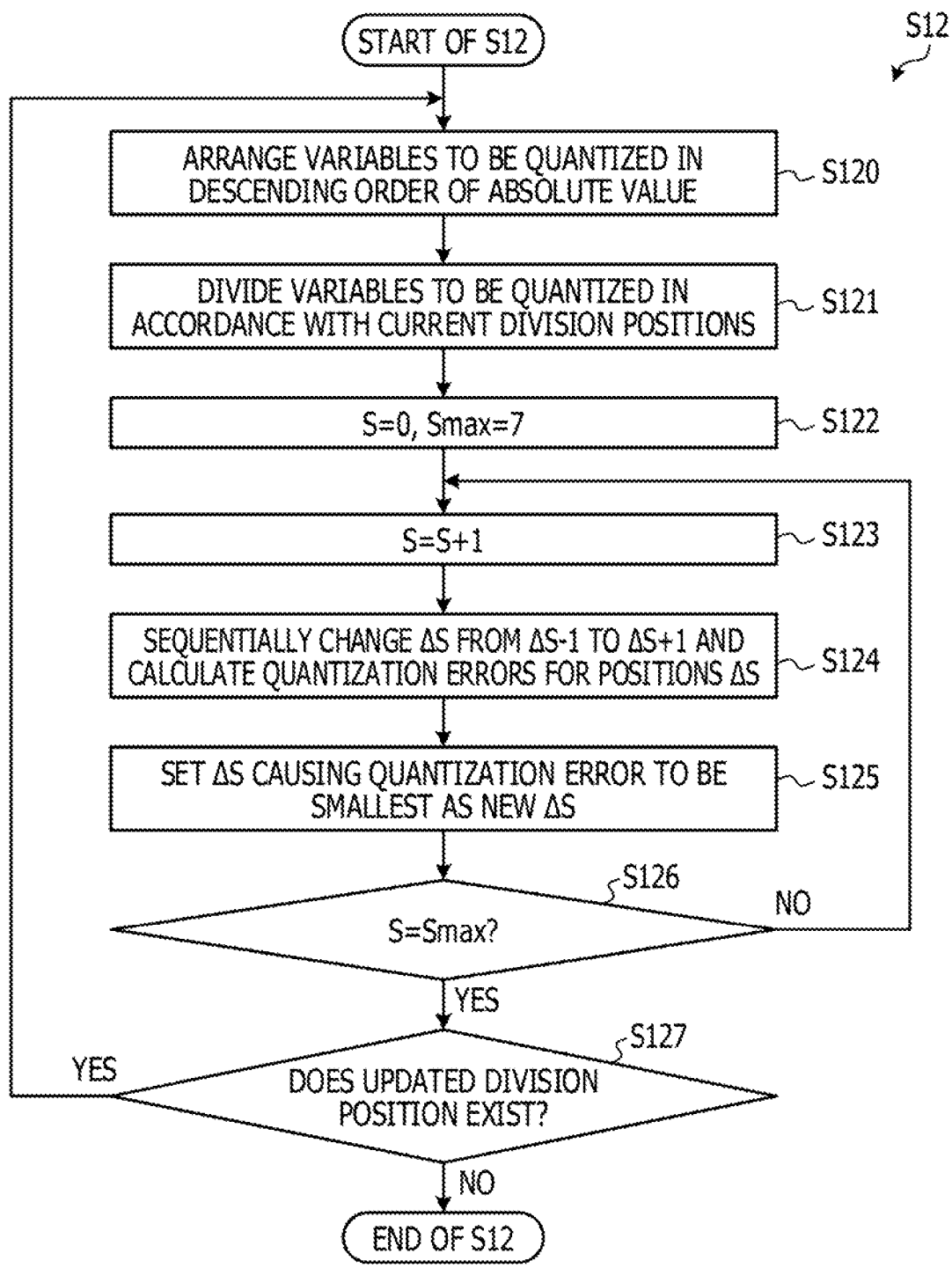
FIG. 7 is a flow diagram illustrating an example of step S12 illustrated in FIG. 6.

FIG. 7 illustrates an example of step S12 illustrated in FIG. 6. First, in step S120, the position setting unit 12A arranges the variables in descending order of absolute value. The variables are to be quantized and are the weights or the like. For example, the variables are not distinguished between positive and negative values and are arranged. Then, in step S121, the position setting unit 12A divides the variables to be quantized in accordance with the current division positions. The variables are the weights or the like.

Next, in step S122, the position setting unit 12A sets a variable S indicating a division position to "0" and sets a variable Smax indicating a division position S7 indicated by the maximum value to "7". Next, in step S123, the position setting unit 12A increases the variable S by "1".

Next, in step S124, the position setting unit 12A sequentially changes a division position ΔS indicated by the variable S from a division position ΔS−1 to a division position ΔS+1 and calculates a quantization error for each of the division positions ΔS, as described with reference to FIG. 4. For example, when S="1", the position setting unit 12A sequentially changes the division position Δ1 from the division position Δ0 to the division position Δ2 and calculates a quantization error for each of the division positions Δ1. For example, the position setting unit 12A uses the foregoing Equation (1) to calculate the quantization errors.

Next, in step S125, the position setting unit 12A sets, as a new division position ΔS, the division position ΔS for which the smallest quantization error has been calculated among the quantization errors calculated in step S124.

Next, when the variable S is equal to the variable Smax in step S126, the position setting unit 12A has changed all the division positions Δ1 to Δ7 and calculated the quantization errors and thus causes the process to proceed to step S127. When the variable S is not equal to the variable Smax in step S126, a division position that has not been changed exists and thus the position setting unit 12A causes the process to return to step S123.

When a division position updated in step S124 or S125 executed immediately before exists in step S127, the convergence of the division position corresponding to the smallest quantization error is not completed and the position setting unit 12A causes the process to return to step S120. On the other hand, when the division position updated in step S124 or S125 executed immediately before does not exist, the position setting unit 12A determines that the convergence of the division position corresponding to the smallest quantization error has been completed, terminates the process illustrated in FIG. 7, and causes the process to proceed to the process of step S14 illustrated in FIG. 6. For example, when a division position is not changed in the continuous two processes of steps S124 and S125, the process illustrated in FIG. 7 is terminated.

Figure 8:
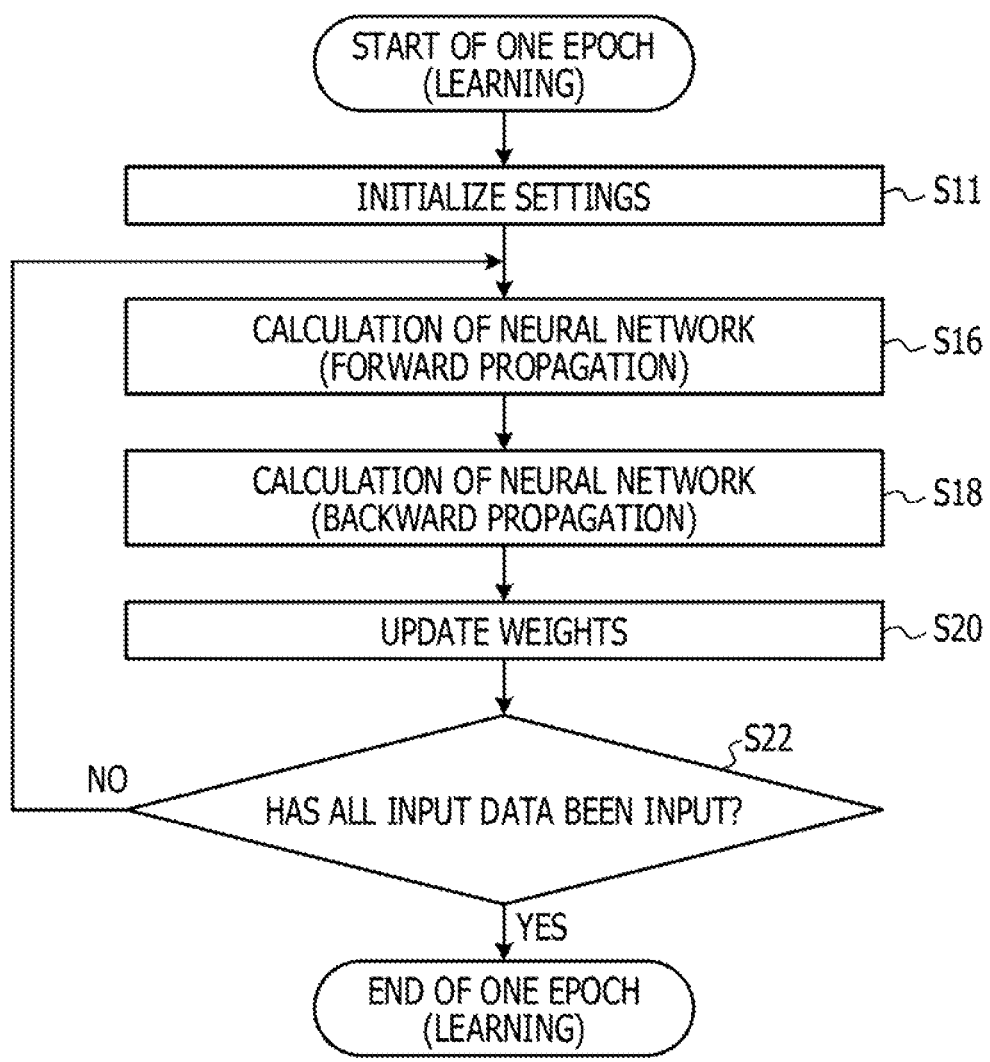
FIG. 8 is a flow diagram illustrating an example of the learning of the neural network by the other information processing device.

FIG. 8 illustrates an example of the learning of the neural network by the other information processing device. Processes that are illustrated in FIG. 8 and are the same as or similar to those illustrated in FIG. 6 are indicated by the same reference signs as those illustrated in FIG. 6 and will not be described. In the learning illustrated in FIG. 8, step S11 is executed instead of step S10 illustrated in FIG. 6, and steps S16, S18, S20, and S22 illustrated in FIG. 6 are repeatedly executed after step S11. For example, in the learning illustrated in FIG. 8, steps S12 and S14 illustrated in FIG. 6 are not executed.

In step S11, the division positions to be used for the quantization process are set after the process of step S10 illustrated in FIG. 6. For example, the division positions are set at equal intervals, as indicated by the initial state illustrated in FIG. 4. The division positions set at the equal intervals are not changed and are used in learning of steps S16, S18, and S20.

Figure 9:
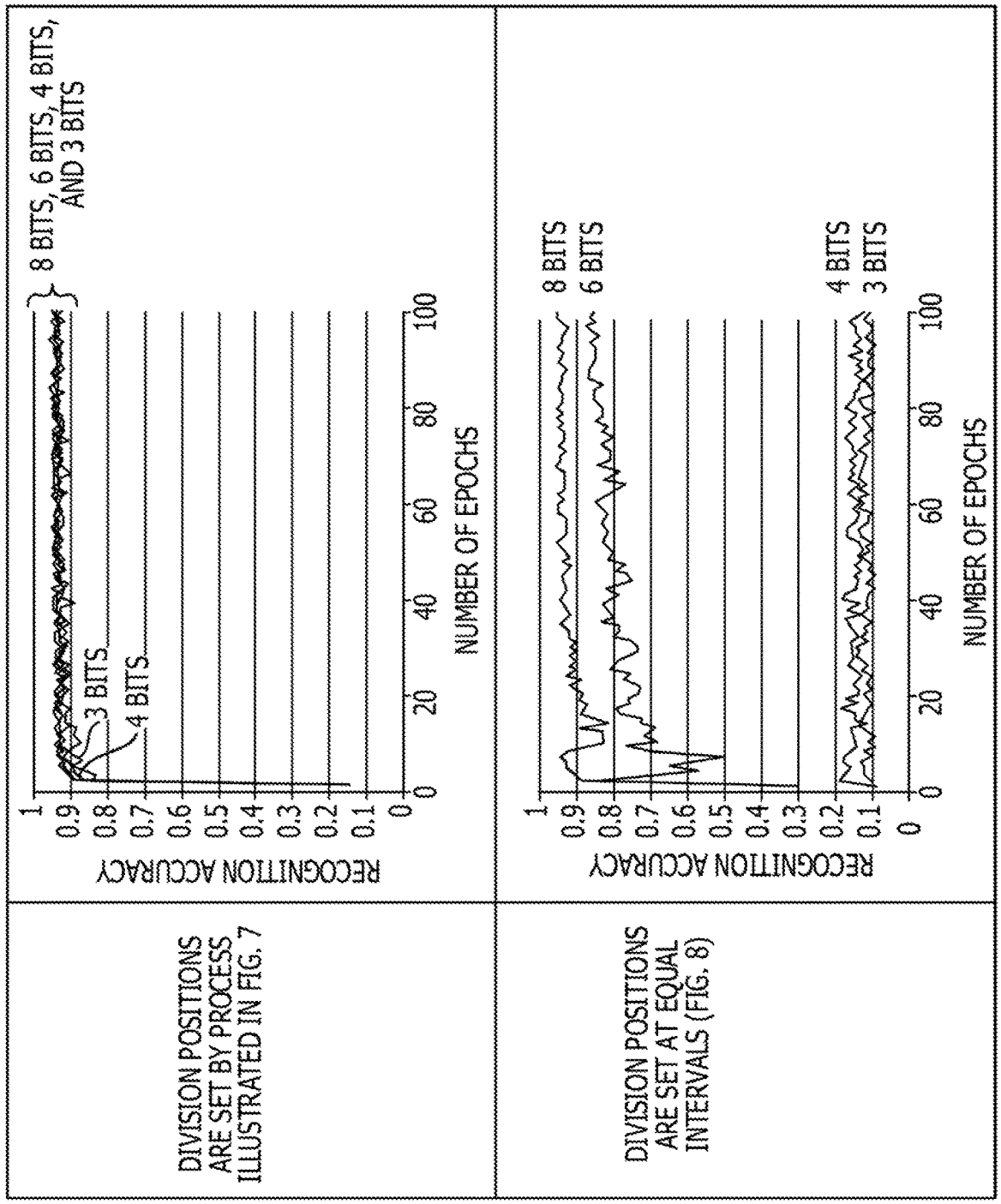
FIG. 9 is an explanatory diagram illustrating an example of the recognition accuracy of the neural network when the learning is repeatedly executed.

FIG. 9 illustrates an example of the recognition accuracy of the neural network when the learning is repeatedly executed. The upper side of FIG. 9 indicates the transition of the recognition accuracy when the learning is repeatedly executed by the process illustrated in FIG. 6. The lower side of FIG. 9 indicates the transition of the recognition accuracy when the learning is repeatedly executed by the process illustrated in FIG. 8. The number of times that the learning is repeatedly executed is indicated by the number of epochs.

In the learning (indicated on the upper side of FIG. 9) by the process illustrated in FIG. 6, even when the number of bits after the quantization is set to any of 8, 6, 4, and 3, there is no significant difference between the recognition accuracy (recognition rate) of the neural network. For example, even when each of the variables is quantized to 3 bits or 4 bits, the recognition accuracy that is equivalent to the recognition accuracy when each of the variables is quantized to 8 bits may be obtained. The number of epochs before the recognition accuracy reaches desired recognition accuracy (for example, 0.9) is approximately 20 in the case where each of the variables is quantized to 3 bits. However, there is no significant difference between the number of epochs before the recognition accuracy reaches the desired recognition accuracy in the case where each of the variables is quantized to 4 bits and the numbers of epochs before the recognition accuracy reaches the desired recognition accuracy in the cases where each of the variables is quantized to 8 bits and 6 bits. For example, even in the case where each of the variables is quantized to 3 bits, the desired recognition accuracy may be obtained by increasing the number of times that the learning is repeatedly executed. As a result, for example, by using the accelerator 30 (refer to FIG. 3) having many simple computing units for a small number of bits, the efficiency of the learning may be improved and power to be consumed may be reduced, compared to the case where the learning is executed using a computing unit for a large number of bits.

On the other hand, in the learning (indicated on the lower side of FIG. 9) by the process illustrated in FIG. 8, the recognition accuracy when each of the variables is quantized to 3 bits or 4 bits significantly decreases and is at a level that does not endure practical use, compared to the recognition accuracy when each of the variables is quantized to 6 bits or 8 bits. The recognition accuracy when each of the variables is quantized to 6 bits decreases, compared to the recognition accuracy when each of the variables is quantized to 8 bits. Even when each of the variables is quantized to bits other than 8 bits, and the learning is repeatedly executed, the recognition accuracy may not reach the desired recognition accuracy (for example, 0.9).

As illustrated on the upper side of FIG. 9, by setting the division positions corresponding to the smallest quantization errors for each of mini-batch processes, the recognition accuracy of the neural network may be improved and the convergence of the division positions may be completed in the learning by a smaller number of epochs, compared to the case where the division positions are fixed and set.

Figure 10:
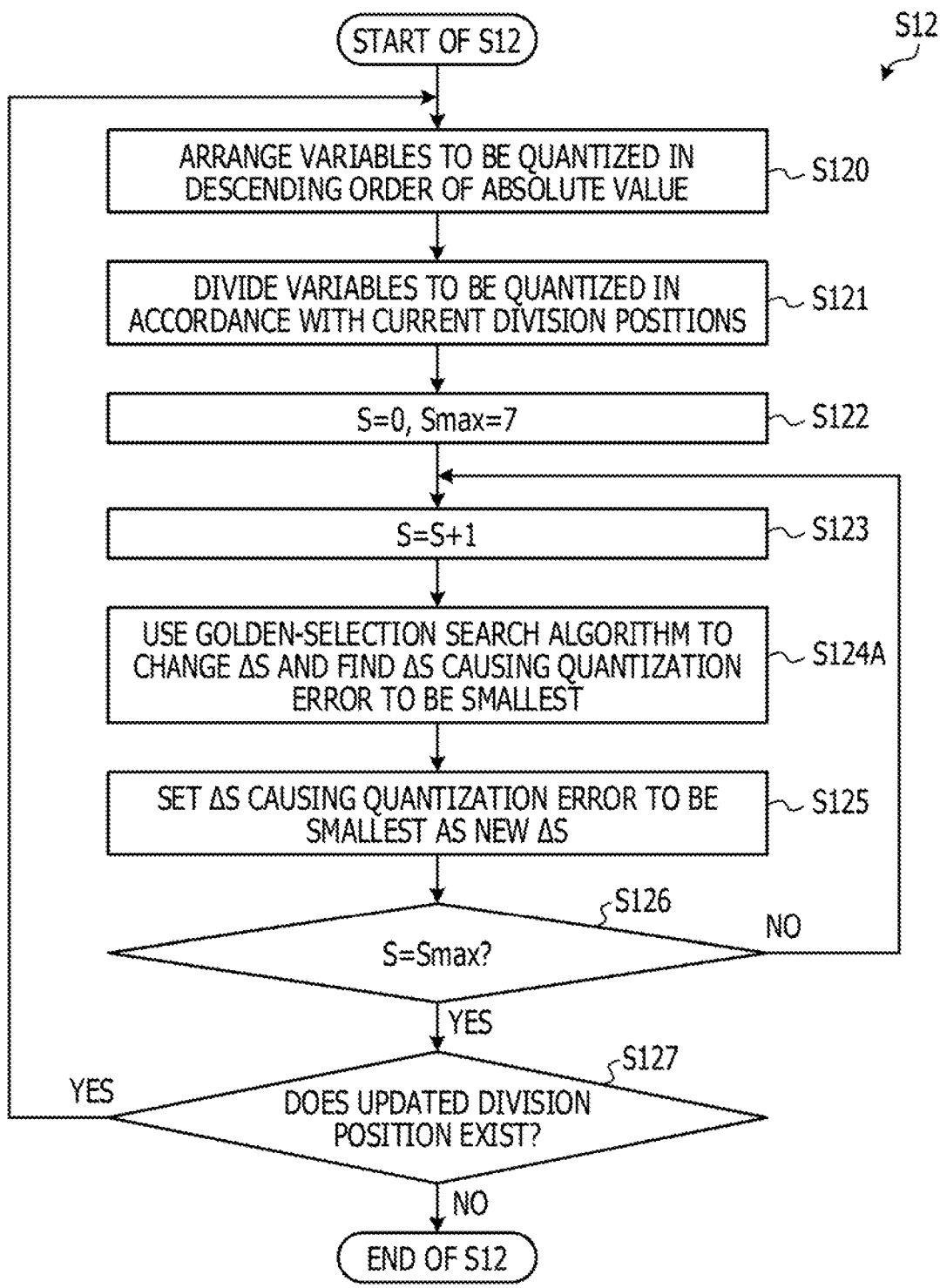
FIG. 10 is a flowchart illustrating another example of step S12 illustrated in FIG. 7.

FIG. 10 illustrates another example of step S12 illustrated in FIG. 7. Processes that are illustrated in FIG. 10 and are the same as or similar to those illustrated in FIG. 7 are indicated by the same reference signs as those illustrated in FIG. 7 and will not be described in detail. In FIG. 10, step S124A is executed, instead of step S124 illustrated in FIG. 7. The other processes are the same as or similar to those illustrated in FIG. 7. The processes illustrated in FIG. 10 are used when changes in a quantization error indicate downward convex characteristics.

In step S124A, the position setting unit 12A uses a golden-selection search algorithm to change the division position ΔS and find the division position ΔS that causes a quantization error to be smallest. For example, the quantization error is calculated using the foregoing Equation (1).

By using the golden-selection search algorithm, the number of searches executed until the division position ΔS that causes the quantization error to be smallest is found may be reduced and the amount of calculation of the optimal division position ΔS may be reduced. As a result, a time period for executing the learning illustrated in FIG. 6 may be reduced, compared to the case where the golden-selection search algorithm is not used.

Figure 11:
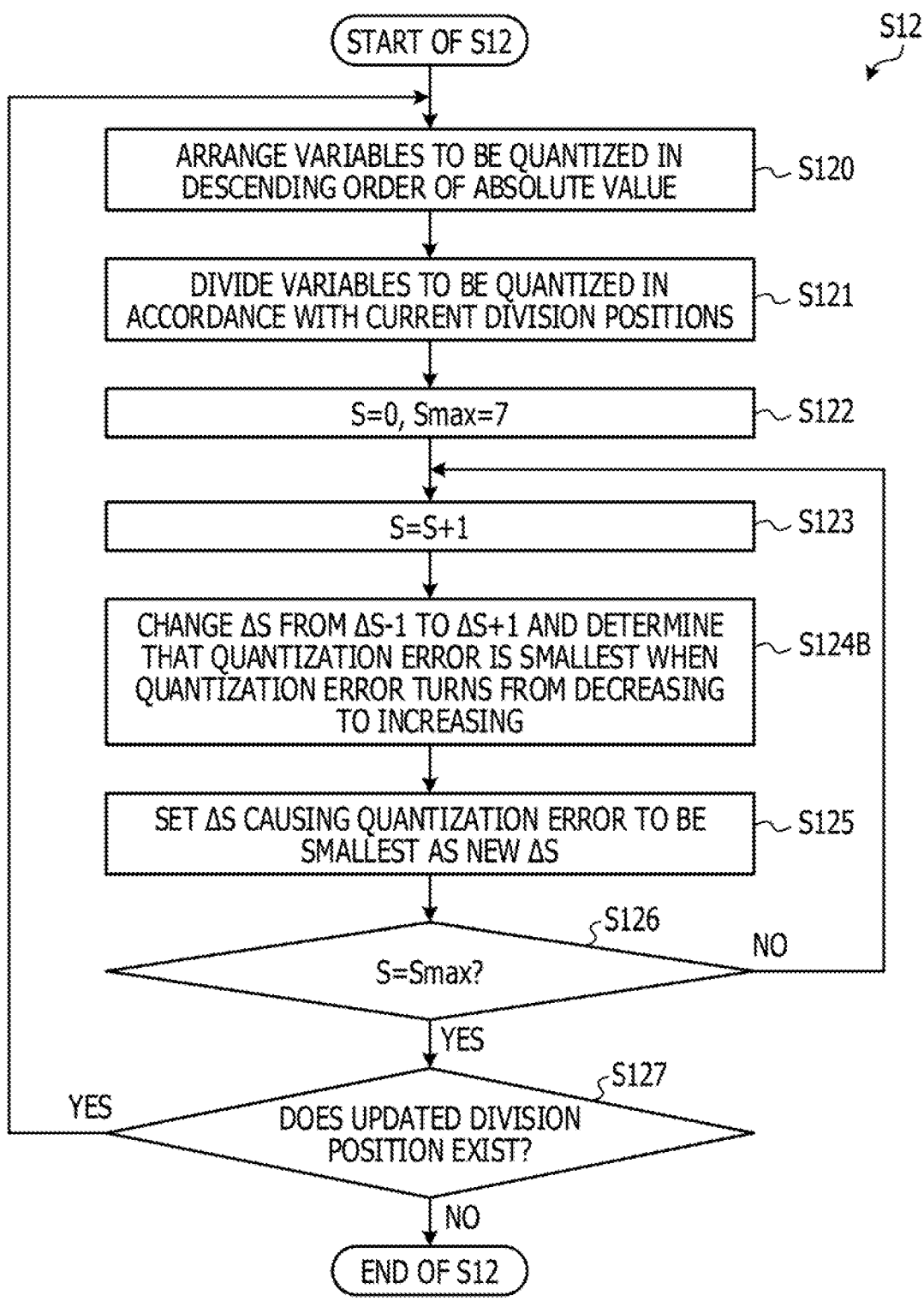
FIG. 11 is a flow diagram illustrating still another example of step S12 illustrated in FIG. 7.

FIG. 11 illustrates still another example of step S12 illustrated in FIG. 7. Processes that are illustrated in FIG. 11 and are the same as or similar to those illustrated in FIG. 7 are indicated by the same reference signs as those illustrated in FIG. 7 and will not be described in detail. In FIG. 11, step S124B is executed, instead of step S124 illustrated in FIG. 7. The other processes are the same as or similar to those illustrated in FIG. 7. The processes illustrated in FIG. 11 are used when changes in a quantization error indicate downward convex characteristics.

In step S124B, the position setting unit 12A changes the division position ΔS from one (for example, ΔS−1) of division positions adjacent to the division position ΔS toward the other (for example, ΔS+1) of the division positions adjacent to the division position ΔS, and determines that the quantization error is smallest when the quantization error turns from decreasing to increasing. For example, the quantization error is calculated using the foregoing Equation (1).

In FIG. 11, the number of times that the quantization error is calculated may be reduced and a time period for executing the learning may be reduced, compared to the case where the division position ΔS is changed completely from the division position ΔS−1 to the division position ΔS+1 to calculate the quantization error.

In the embodiment described with reference to FIGS. 3 to 11, by changing the division positions to positions that cause quantization errors to be smallest as in the embodiment described with reference to FIGS. 1 and 2, the accuracy of the calculation of the neural network may be improved, compared to the case where the division positions are not changed. For example, when the calculation of the neural network is executed using the quantized variables, a decrease in the accuracy of the calculation may be suppressed. For example, since the computation of the neural network is executed using the fixed-point number data, the computation efficiency of the CPU 10A may be improved and the power efficiency may be improved, compared to the case where the floating-point number data is used.

In the embodiment described with reference to FIGS. 3 to 11, by optimizing the division positions for each of mini-batch processes of learning the neural network and repeatedly executing the learning, the number of times that the learning is executed until the recognition rate reaches the desired recognition rate may be reduced and the learning efficiency may be improved. Since the process of calculating the optimal division positions Δ1 to Δ7 is executed using the absolute values that are not distinguished between positive and negative values, the amount of the calculation for the quantization may be reduced, compared to the case where the absolute values are distinguished between positive and negative values.

Figure 12:
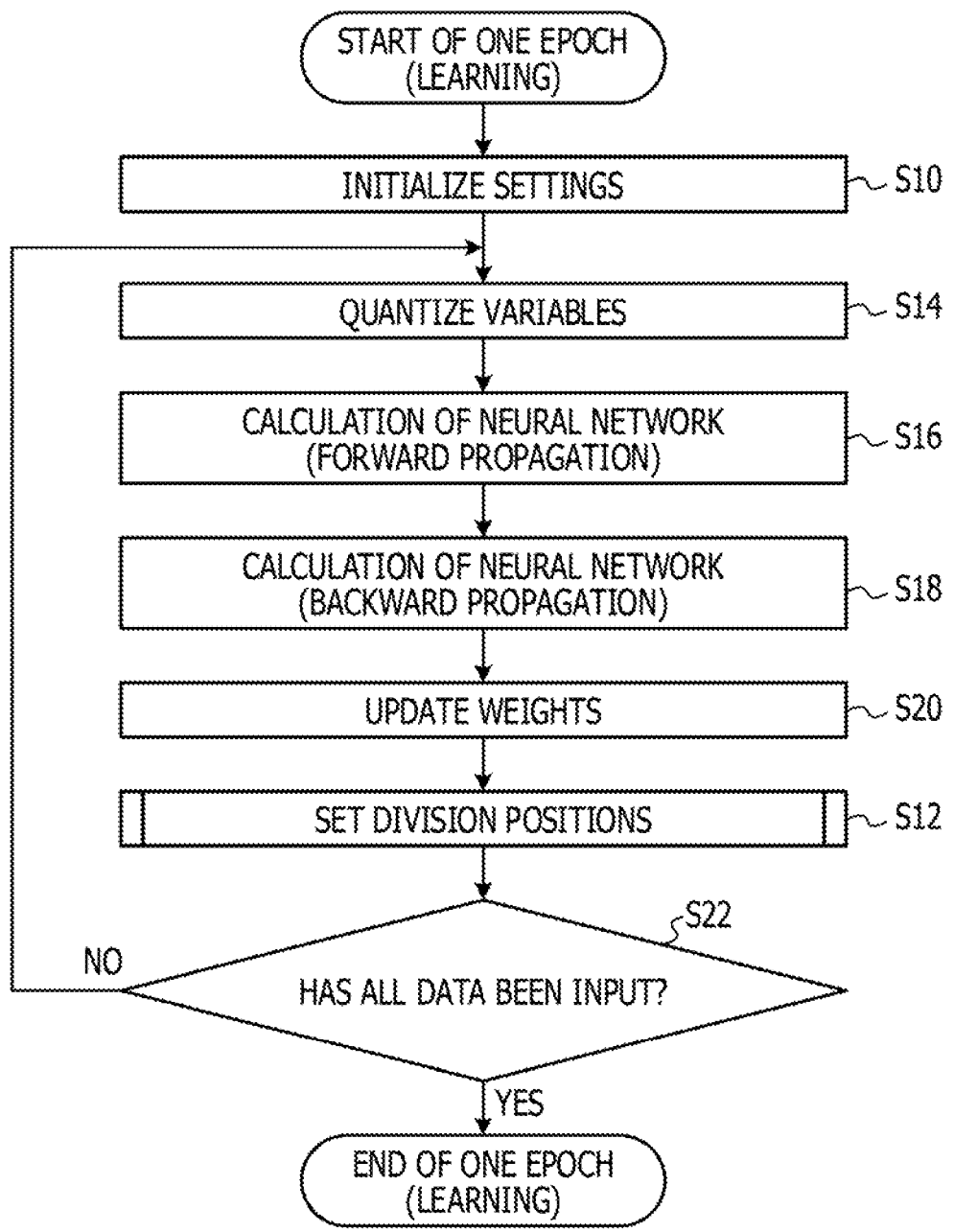
FIG. 12 is a flow diagram illustrating an example of operations of an information processing device according to another embodiment.

FIG. 12 illustrates an example of operations of an information processing device according to another embodiment. Processes that are illustrated in FIG. 12 and are the same as or similar to those illustrated in FIG. 6 are indicated by the same reference signs as those illustrated in FIG. 6 and will not be described. The information processing device that executes a flow illustrated in FIG. 12 is, for example, the information processing device 100A illustrated in FIG. 3. The information processing device 100A realizes processes illustrated in FIG. 12 by executing the information processing program. For example, the flow illustrated in FIG. 12 indicates an example of the information processing method by the information processing device 100A and an example of the operations by the information processing program executed by the information processing device 100A.

In the flow illustrated in FIG. 12, step S12 is executed between steps S20 and S22. The process of step S12 may be started not only upon the completion of step S20 but also upon the completion of step S16 and the completion of step S18. The process to be executed in step S12 illustrated in FIG. 12 is any of step S12 illustrated in FIG. 7, step S12 illustrated in FIG. 10, and step S12 illustrated in FIG. 11.

For example, division positions for quantization of intermediate data in a next mini-batch process are set using intermediate data (input data to be input to a next layer) generated by the forward propagation in step S16. Division positions for quantization of intermediate data in a next mini-batch process are set using intermediate data (input data to be input to a next layer) generated by the back-propagation in step S18. Similarly, division positions for quantization of the variables in a next mini-batch process are set using the variables such as the weights updated in step S20.

In an initial mini-batch process, the division positions are not set. Thus, in the initial mini-batch process, the variables are quantized using default division positions. For example, the default division positions are set at equal intervals in step S10, as indicated by the initial state illustrated in FIG. 4. In each of the mini-batch processes, the variables are quantized using the division positions set in the previous mini-batch process.

By executing a process of setting the division positions in step S12 after the learning and before a next mini-batch process, processes of setting the division positions for the forward propagation, the back-propagation, and the update of the weights may be started upon the termination of the calculation for the forward propagation, the back-propagation, and the update of the weights. Therefore, for example, the processes of setting the division positions for the forward propagation, the back-propagation, and the update of the weights may be executed in parallel by a plurality of the information processing devices 100A. As a result, a time period for executing the calculation for the setting of the division positions may be reduced and a time period for executing the learning of the neural network may be reduced, compared to FIG. 6.

Figure 13:
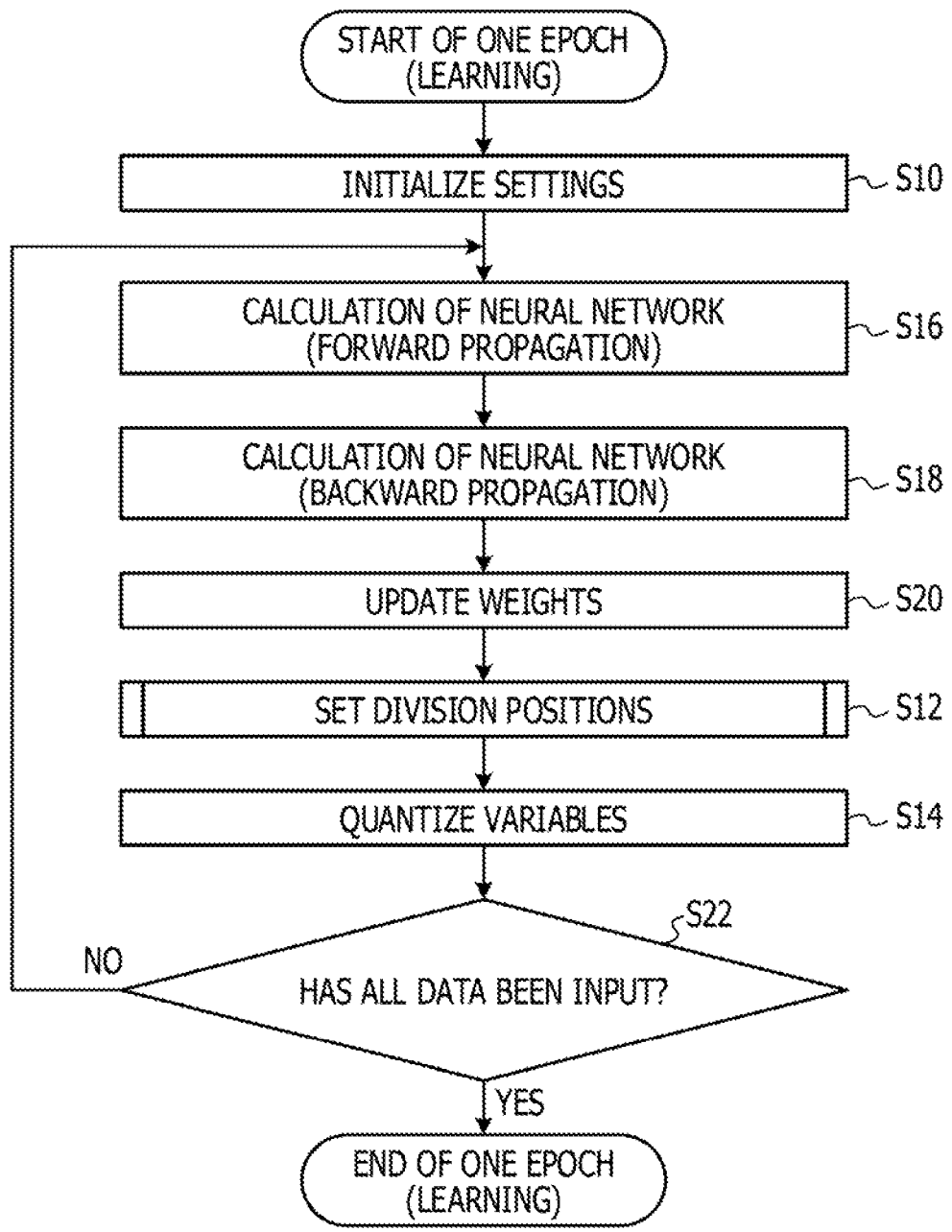
FIG. 13 is a flow diagram illustrating an example of operations of an information processing device according to still another embodiment.

FIG. 13 illustrates an example of operations of an information processing device according to still another embodiment. Processes that are illustrated in FIG. 13 and are the same as or similar to those illustrated in FIG. 6 are indicated by the same reference signs as those illustrated in FIG. 6 and will not be described. The information processing device that executes a flow illustrated in FIG. 13 is, for example, the information processing device 100A illustrated in FIG. 3. The information processing device 100A realizes processes illustrated in FIG. 13 by executing the information processing program. For example, the flow illustrated in FIG. 13 indicates an example of the information processing method by the information processing device 100A and an example of the operations by the information processing program executed by the information processing device 100A.

In the flow illustrated in FIG. 13, steps S12 and S14 are executed between steps S20 and S22. Processes of steps S12 and S14 may be started not only upon the completion of step S20 but also upon the completion of step S16 and the completion of step S18, similarly to FIG. 12. In the initial mini-batch process, the variables are quantized using the default division positions in step S10, similarly to FIG. 12. In each of the second and later mini-batch processes, the variables are quantized using the division positions set in the previous mini-batch process. The process to be executed in step S12 illustrated in FIG. 13 is any of step S12 illustrated in FIG. 7, step S12 illustrated in FIG. 10, and step S12 illustrated in FIG. 11.

In the embodiment described with reference to FIG. 13, the processes of setting the division positions for the forward propagation, the back-propagation, and the update of the weights may be started upon the termination of the calculation for the forward propagation, the back-propagation, and the update of the weights as in the embodiment described with reference to FIG. 12. The quantization of the variables may be started upon the setting of the division positions. Therefore, for example, the processes of setting the division positions for the forward propagation, the back-propagation, and the update of the weights, and the quantization of the variables may be executed in parallel by a plurality of the information processing devices 100A. As a result, time periods for executing calculation for the setting of the division positions and calculation for the quantization of the variables may be reduced and a time period for executing the learning in the neural network may be reduced, compared to FIGS. 6 and 12.

Figure 14:
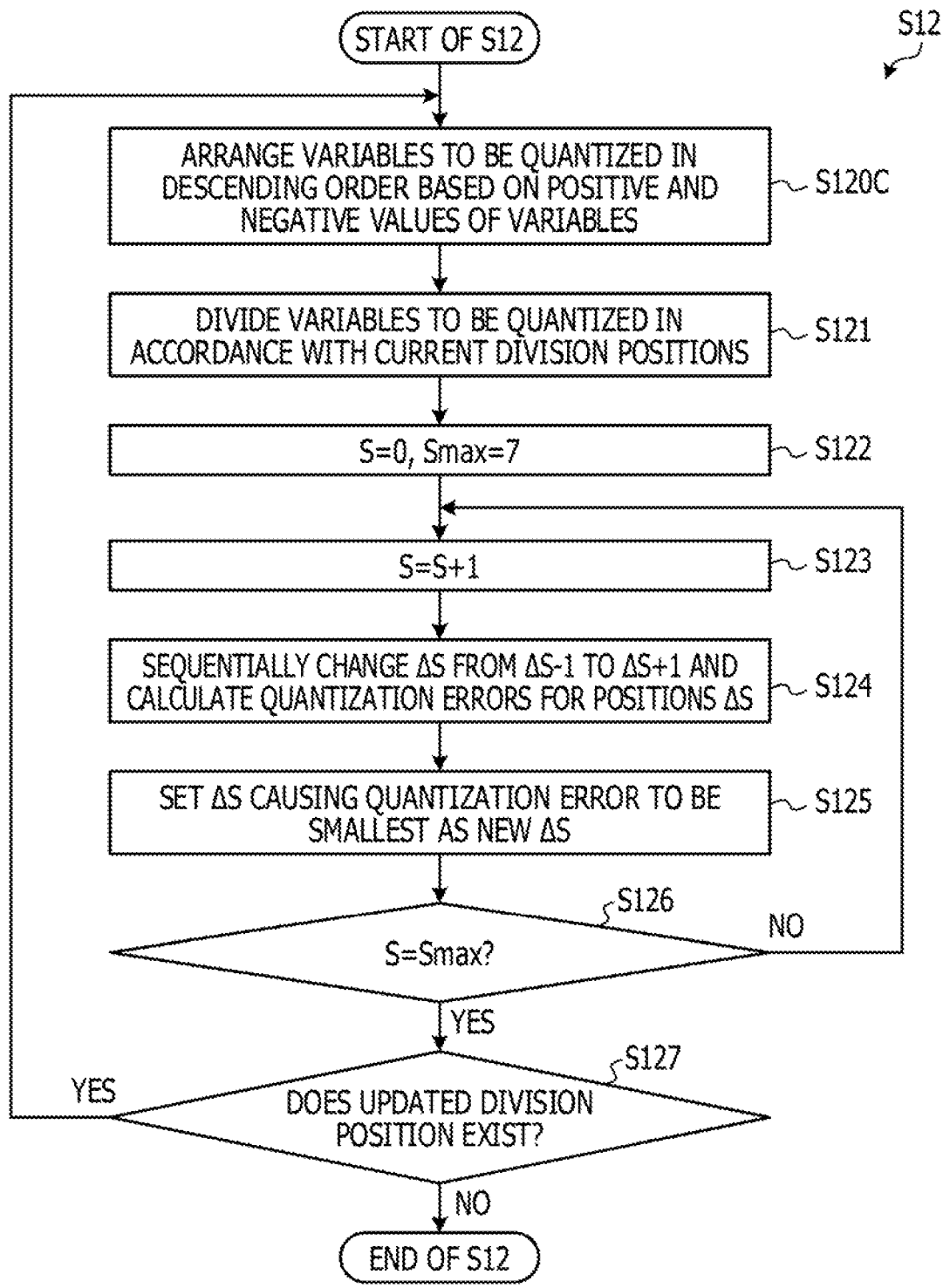
FIG. 14 is a flow diagram illustrating an example of operations of an information processing device according to another embodiment.

FIG. 14 is a diagram illustrating an example of operations of an information processing device according to another embodiment. Processes that are illustrated in FIG. 14 and are the same as or similar to those illustrated in FIG. 7 are indicated by the same reference signs as those illustrated in FIG. 7 and will not be described in detail. The information processing device that executes a flow of step S12 illustrated in FIG. 14 is, for example, the information processing device 100A illustrated in FIG. 3. The information processing device 100A realizes processes illustrated in FIG. 14 by executing the information processing program. For example, the flow illustrated in FIG. 14 indicates an example of the information processing method by the information processing device 100A and an example of the operations by the information processing program executed by the information processing device 100A.

The information processing device 100A executes the processes illustrated in FIG. 6. In FIG. 14, step S120C is executed, instead of step S120 illustrated in FIG. 7. The other processes are the same as or similar to those in FIG. 7. In step S120C, the position setting unit 12A arranges the variables in descending order based on positive and negative values of the variables. The variables are the weights to be quantized or the like. For example, the variables are distinguished between the positive and negative values and arranged. Processes of steps S121 to S127 that are executed after step S120C are the same as or similar to those described with reference to FIG. 7.

In this embodiment, since the variables are distinguished between the positive and negative values and arranged in descending order, the positive values and the negative values are separately divided in step S121. When the process of calculating the optimal division positions is executed using the values of the variables distinguished between the positive and negative values and arranged in descending order, the amount of the calculation for the quantization increases, compared to the case where the variables are not distinguished between the positive and negative values. On the other hand, a decrease (for example, the amounts of the quantization errors) in the recognition rate in the neural network is smaller, compared to the case where the variables are not distinguished between the positive and negative values. Therefore, when a neural network in which a decrease in a recognition rate is suppressed is to be built, it is preferable that the process of calculating the optimal division positions be executed using the values of the variables distinguished between the positive and negative values.

In the embodiment described with reference to FIG. 14, effects that are the same as or similar to those obtained in the embodiments described with reference to FIGS. 1 to 11 may be obtained. In the embodiment described with reference to FIG. 14, by distinguishing the variables between the positive and negative values and setting the optimal division positions, the recognition rate of the neural network after the learning may be improved, compared to the case where the variables are distinguished between the positive and negative values. Step S120 illustrated in FIG. 10 and step S120 illustrated in FIG. 11 may be replaced with step S120C illustrated in FIG. 14.

Figure 15:
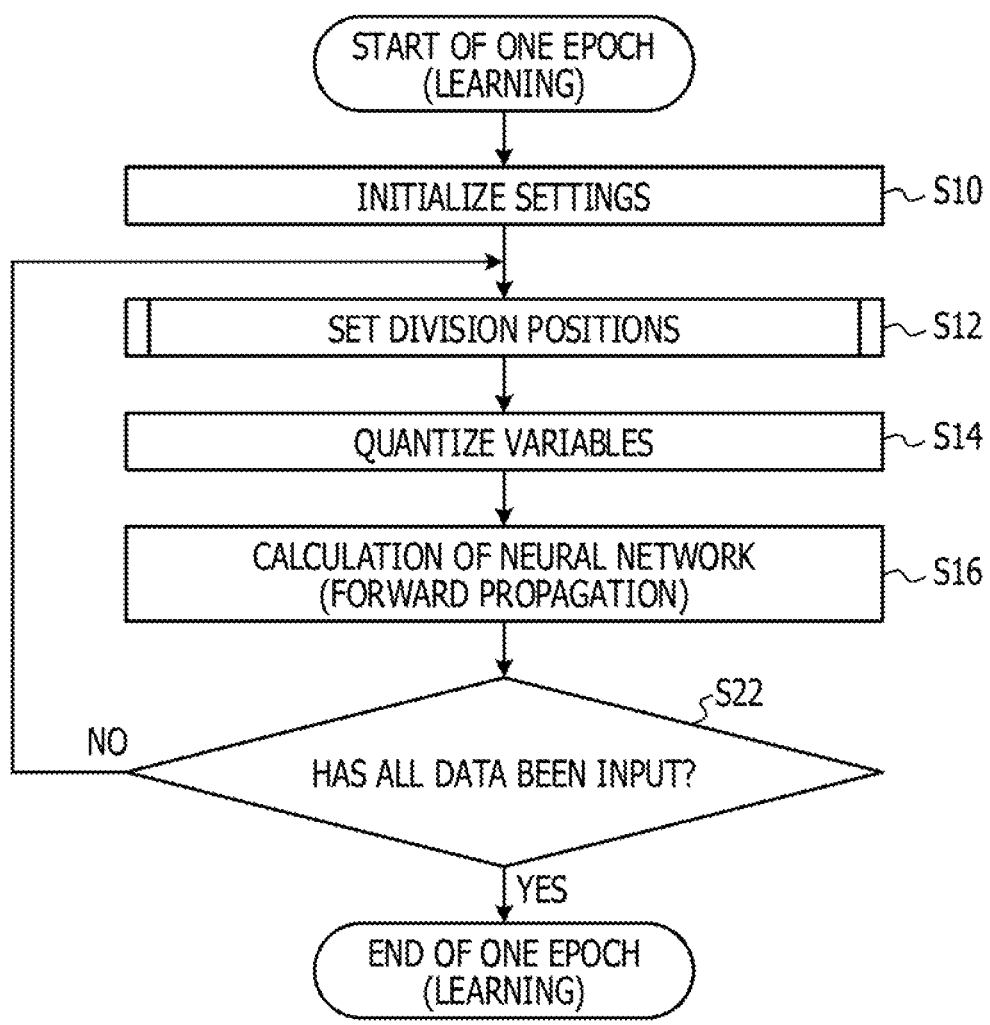
FIG. 15 is a flow diagram illustrating an example of operations of an information processing device according to another embodiment.

FIG. 15 illustrates an example of operations of an information processing device according to another embodiment. Processes that are illustrated in FIG. 15 and are the same as or similar to those illustrated in FIG. 6 are indicated by the same reference signs as those illustrated in FIG. 6 and will not be described. The information processing device that executes a flow illustrated in FIG. 15 is, for example, the information processing device 100A illustrated in FIG. 3. The information processing device 100A realizes processes illustrated in FIG. 15 by executing the information processing program. For example, the flow illustrated in FIG. 15 indicates an example of the information processing method by the information processing device 100A and an example of the operations by the information processing program executed by the information processing device 100A.

In the flow illustrated in FIG. 15, the processes of steps S18 and S20 are removed from the operations illustrated in FIG. 6. For example, in the flow illustrated in FIG. 15, inference is executed by the neural network based on learning executed in advance. Even in the case where inference is executed, the division positions are updated for each of mini-batch processes, the variables are quantized using the updated division positions, and thus a decrease in the recognition rate of the neural network using the quantized variables may be reduced, similarly to FIG. 6. The process to be executed in step S12 illustrated in FIG. 15 is any of step S12 illustrated in FIG. 7, step S12 illustrated in FIG. 10, and step S12 illustrated in FIG. 11. The processes of steps S18 and S20 may be removed from the foregoing FIGS. 12 and 13, and the inference may be executed based on the learning executed in advance.

Features and advantages of the embodiments will be clarified from the foregoing detailed description. The claims are intended to cover the features and advantages of the foregoing embodiments without departing from the spirit and scope of the claims. Any person skilled in the art may easily find any improvements and changes. Therefore, there is no intention to limit the scope of the inventive embodiments to those described above, and it is possible to rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device that executes calculation of a neural network, comprising:
   a memory; and
   a processor coupled to the memory and the processor configured to:
      set division positions for changing a variable from floating-point number to fixed-point number,
      acquire the quantization error $L_{oss}$ using Equation (4), $$\text{Loss} = -\sum_{i=1}^{n} \frac{\|W_{k_i}\|_{L1}^2}{k_i} \quad (4)$$

where n is the number of variables to be changed (n is a natural number of 2 or greater), $k_i$ is the number of non-zero elements of a variable $W_i$ to be changed, and $W_{ki}$ is a variable that has the same number of elements as the variable $W_i$ and of which the elements are a number k of elements extracted from the variable $W_i$ in descending order of absolute value and elements of 0 other than the extracted elements,
      specify a combination of the division positions by changing each of the division positions so that the quantization error $L_{oss}$ between the variable before the changing and the variable after the changing is minimized, and
      change the variable from floating-point number to fixed-point number based on the specified combination of the division positions.

2. The information processing device according to claim 1, wherein the processor is configured to:
   repeatedly execute a process of changing the division positions one by one and finding the division positions that cause quantization errors to be smallest until the division positions are no longer changed, and
   set the division positions that are no longer changed as the division positions to be used for the changing.

3. The information processing device according to claim 1, wherein the processor is configured to when changes in the quantization error $L_{oss}$ indicate downward convex characteristics, use a golden-selection search algorithm to search the division positions that causes the quantization error $L_{oss}$ to be smallest.

4. The information processing device according to claim 1, wherein the processor is configured to when changes in the quantization error $L_{oss}$ indicate downward convex characteristics, sequentially change a first division position of the division positions from another division position adjacent to the first division position and determines that the quantization error $L_{oss}$ is smallest when the quantization error $L_{oss}$ turns from decreasing to increasing.

5. The information processing device according to claim 1, wherein the processor is configured to start executing a process of setting the division positions from an initial state in which the division positions are set at equal intervals.

6. The information processing device according to claim 1, wherein the processor is configured to set the division positions using an absolute value of the variable.

7. The information processing device according to claim 1, wherein the processor is configured to set the division positions using the variable distinguished between positive and negative values.

8. The information processing device according to claim 1, wherein the processor is configured to set the number of division positions corresponding to a number $2^m$ (m is a natural number of 1 or greater) of variables after the changing.

9. The information processing device according to claim 1, wherein the processor is configured to:
   repeatedly execute a batch process including a forward propagation process of sequentially executing calculation from an input side of the neural network, a back-propagation process of sequentially executing calculation from an output side of the neural network, and an update process of updating the variable based on a result of the back-propagation process, and
   in each of the batch processes, set the division position to be used in a next batch process after the update process.

10. The information processing device according to claim 1, wherein the processor is configured to use the division position set by the position setting unit to change the variable to be used for inference of the neural network.

11. An information processing method by an information processing device that executes calculation of a neural network, the information processing method comprising:
   setting division positions for changing a variable from floating-point number to fixed-point number;
   acquiring the quantization error $L_{oss}$ using Equation (4), $$\text{Loss} = -\sum_{i=1}^{n} \frac{\|W_{k_i}\|_{L1}^2}{k_i} \quad (4)$$

where n is the number of variables to be changed (n is a natural number of 2 or greater), $k_i$ is the number of non-zero elements of a variable $W_i$ to be changed, and $W_{ki}$ is a variable that has the same number of elements as the variable $W_i$ and of which the elements are a number k of elements extracted from the variable $W_i$ in descending order of absolute value and elements of 0 other than the extracted elements;
   specifying a combination of the division positions by changing each of the division positions so that the quantization error $L_{oss}$ between the variable before the changing and the variable after the changing is minimized; and changing the variable from floating-point number to fixed-point number based on the specified combination of the division positions.

12. A non-transitory computer-readable recording medium storing an information processing program that causes an information processing device configured to execute calculation of a neural network to execute a process, the process comprising:

setting division positions for changing a variable from floating-point number to fixed-point number;

acquiring the quantization error $L_{oss}$ using Equation (4), $$\text{Loss} = -\sum_{i=1}^{n} \frac{\|W_{k_i}\|_{L1}^2}{k_i} \quad (4)$$

where n is the number of variables to be changed (n is a natural number of 2 or greater), $k_i$ is the number of non-zero elements of a variable $W_i$ to be changed, and $W_{ki}$ is a variable that has the same number of elements as the variable $W_i$ and of which the elements are a number k of elements extracted from the variable $W_i$ in descending order of absolute value and elements of 0 other than the extracted elements;

specifying a combination of the division positions by changing each of the division positions so that the quantization error $L_{oss}$ between the variable before the changing and the variable after the changing is minimized; and changing the variable from floating-point number to fixed-point number based on the specified combination of the division positions.

* * * * *